(12) United States Patent
Gupta et al.

(10) Patent No.: US 11,200,082 B2
(45) Date of Patent: Dec. 14, 2021

(54) DATA STORAGE SYSTEM EMPLOYING DUMMY NAMESPACES FOR DISCOVERY OF NVME NAMESPACE GROUPS AS PROTOCOL ENDPOINTS

(71) Applicant: EMC IP Holding Company LLC, Hopkinton, MA (US)

(72) Inventors: Mukesh Gupta, Shrewsbury, MA (US); Dmitry Tylik, Westborough, MA (US); Daniel E. Cummins, Hudson, NH (US); David L. Black, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 263 days.

(21) Appl. No.: 16/669,803

(22) Filed: Oct. 31, 2019

(65) Prior Publication Data

US 2021/0132972 A1 May 6, 2021

(51) Int. Cl.
*G06F 9/455* (2018.01)

(52) U.S. Cl.
CPC .......... *G06F 9/45558* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 7,937,453 | B1* | 5/2011 | Hayden | G06F 16/183 709/219 |
| 8,521,984 | B2* | 8/2013 | Asano | G06F 3/067 711/170 |
| 8,775,765 | B2* | 7/2014 | Asano | G06F 3/0605 711/170 |
| 8,914,567 | B2* | 12/2014 | Miroshnichenko | G06F 3/0635 711/6 |
| 9,501,245 | B2* | 11/2016 | Hussain | G06F 3/067 |
| 10,075,524 | B1 | 9/2018 | Bshara et al. | |
| 10,552,072 | B1* | 2/2020 | Bono | G06F 3/061 |
| 10,684,958 | B1* | 6/2020 | Nair | G06F 3/0641 |
| 10,782,989 | B2* | 9/2020 | Jin | G06F 3/0673 |
| 10,897,488 | B1* | 1/2021 | Gupta | H04L 67/42 |
| 2015/0317088 | A1* | 11/2015 | Hussain | G06F 9/50 711/103 |

(Continued)

*Primary Examiner* — Van H Nguyen
(74) *Attorney, Agent, or Firm* — BainwoodHuang (57) ABSTRACT

A data storage system (DSS) in a cluster provides virtual-volume data storage to virtual-computing (VC) hosts using NVMe-oF storage interconnect. A DSS creates protocol endpoints (PEs) and corresponding namespace groups, each being a grouping of namespaces corresponding to virtual volumes (vVols) to be bound for access by a respective VC host, and each namespace being mapped to corresponding underlying physical storage. Each namespace group is initially created with a corresponding in-band discoverable dummy namespace. In response to in-band storage discovery commands from the VC hosts, and based on the existence of the dummy namespaces, the DSS responds with responses identifying the namespace groups. Then in response to subsequent vVol creation commands from the VC hosts, the DSS creates new namespaces in respective namespace groups and provides namespace identifiers for the new namespaces to the VC hosts for use in accessing data of the vVols.

20 Claims, 4 Drawing Sheets

(56) References Cited

U.S. PATENT DOCUMENTS

| | | | |
|---|---|---|---|
| 2015/0317091 A1* | 11/2015 | Hussain | G06F 3/0619 |
| | | | 711/103 |
| 2017/0344259 A1* | 11/2017 | Freyensee | G06F 3/061 |
| 2018/0188974 A1* | 7/2018 | Cayton | G06F 3/0611 |
| 2019/0354302 A1 | 11/2019 | Enz et al. | |
| 2020/0409601 A1 | 12/2020 | Helmick et al. | |
| 2021/0019063 A1 | 1/2021 | Lee et al. | |
| 2021/0055885 A1 | 2/2021 | Strathman et al. | |

* cited by examiner

DATA STORAGE SYSTEM EMPLOYING DUMMY NAMESPACES FOR DISCOVERY OF NVME NAMESPACE GROUPS AS PROTOCOL ENDPOINTS

BACKGROUND

The present invention relates to data storage systems providing support for virtualized storage objects such as virtual volumes (vVols), in particular in systems employing NVMe over Fabrics (NVMe-oF™), which is a technology specification enabling use of NonVolatile Memory Express (NVMe™).

SUMMARY

A method is disclosed of operating a data storage system in a cluster of storage systems to provide virtual-volume data storage to a plurality of virtual-computing (VC) hosts using NVMe-oF storage interconnect.

The method includes creating protocol endpoints (PEs) and corresponding namespace groups, wherein each namespace group is a grouping of namespaces corresponding to virtual volumes (vVols) to be bound for access by a respective VC host, and each namespace is mapped to corresponding underlying physical storage of the data storage system. Each namespace group is initially created with a corresponding in-band discoverable dummy namespace.

In response to in-band storage discovery commands from the VC hosts, and based on the existence of the dummy namespaces, responses are sent that identify the namespace groups to the respective VC hosts. Then in response to subsequent vVol creation requests from the VC hosts, new namespaces are created in respective namespace groups, and respective namespace identifiers for the new namespaces are provided to the VC hosts for use in accessing data of the respective vVols.

BRIEF DESCRIPTION OF TIE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview—Problem being Addressed

In some applications, data storage systems require integration into virtualization environments such as vSphere® from VMware. To facilitate such integration, specialized application programming interfaces (APIs) are used such as VASA from VMware. Such virtualization APIs are based on the notion of Virtual Volumes (vVols) that represent individual virtual disks of virtual machines (VMs), and Protocol Endpoints (PEs) that aggregate multiple vVols to virtualization hosts (e.g., ESXi hosts) for certain purposes. The hosts use the virtualization APIs to create vVols on a data storage system and to access the data of the vVols, which requires that the data storage system provides vVol-based storage and associated functionality.

A recently introduced technology for host-to-storage attachment is so-called NVMe over Fabrics (NVMe-oF), which is a technology specification enabling use of non-volatile memory express (NVMe) commands to transfer data between a host computer and a target solid-state storage device or system over a fabric type of network, such as Ethernet®, Fibre Channel (FC) or InfiniBand®. In order to fully achieve benefits of vVol technology with storage attachment technologies like NVMe-oF, there is a problem that needs to be addressed. Current VASA/vVol technology is defined for using SCSI storage attachment, and it includes a concept of Protocol Endpoint (PE) as a SCSI Conglomerate LUN. Such PEs are used to enable VASA clients to aggregate asymmetric logical unit access (ALUA) paths for multiple storage objects, so instead of discovering individual vVols (also known as SCSI Subsidiary LUNs) and aggregating respective individual ALUA paths, VASA clients can discover and aggregate paths at the PE level, which are smaller in number and are discoverable up front, prior to the creation of vVols. Unfortunately, PEs as currently known do not map cleanly to any corresponding feature(s) of NVMe, because NVMe contemplates a flat or non-hierarchical naming structure for attached storage—there is no notion analogous to a SCSI Conglomerate LUN or a SCSI Subsidiary LUN.

Another aspect of VASA/vVol environments is their use of both in-band (SCSI based) and out-of-band (VASA-based) protocols between virtualization hosts and storage systems. A storage system must service both protocols, with the servicing entity for the out-of-band protocol being commonly known as "VASA vendor provider" or simply "vendor provider". The out-of-band protocol includes APIs such as:

setContext( ) to establish VASA communication between a host and a storage system.

queryProtocolEndpoint( ) to retrieve the list of PEs supported by the storage system.

setPEContext( ) to inform the storage system of PEs discovered in-band via SCSI protocol, so the storage system is aware which of those PEs are useful for binding vVols for IO operations.

createVirtualVolume( ) to request creation of a vVol (virtual disk) by the storage system.

bindVirtualVolume( ) to request binding a vVol as a Subsidiary SCSI LUN under the PE Administrative SCSI LUN (part of the PE Conglomerate LUN). Once bindVirtualVolume( ) finishes successfully the vVol is available for IO operations.

Note that for setPEContext( ), there must have been a prior discovery of the PEs in an in-band manner, e.g., at the level of the SCSI protocol (via the SCSI REPORT LUNs command).

The presently disclosed technique supports in-band discovery of PEs in a non-SCSI environment such as NVMe-oF.

For VASA in general, NVMe/NVMe-oF present challenges because NVMe concepts do not map 1:1 to SCSI. Additionally, several other factors can also be considered in implementation of PEs for NVMe as follows:

Minimize latency for IO transactions to vVols bound to PEs

Balance IO load across storage systems (appliances) and storage processors (nodes). In one example, each appliance includes two nodes servicing IO, running in a virtual machine or on bare-metal hardware.

Scalability of NVMe asynchronous events for VASA notifications: VASA requires that data state related notifications be raised on a per vVol basis, and path state related notifications be raised on a per PE basis. In environments with many ESXi hosts accessing the same set of PEs, this may result in hosts reacting to many notifications that are not relevant.

Scale VASA API out of band management: In sufficiently large systems, there may be protocol limitations on the number of PEs that can be reported to a host, which may be less than the total number of PEs existing on a storage system. It is necessary to limit PE reporting to only those that are relevant to each host.

Overview—Solution

Clustered Storage Systems can be classified as Symmetric or Asymmetric. In Symmetric Clustered Storage Systems, each node is able to efficiently access all the storage hosted by the cluster whereas Asymmetric Clustered Storage Systems have many appliances each containing a subset of nodes that are able to efficiently access a subset of the storage hosted by the cluster. For simplicity in this description, Symmetric Clustered Storage Systems can be considered as a special case of Asymmetric Clustered Storage Systems in which all nodes of a Symmetric Clustered Storage System comprise a single appliance in an Asymmetric Clustered Storage System. An simplified example of a cluster deployment is described below with reference to FIG. 4.

The disclosed technique assumes an operating environment having some or all of the following features that are found in NVMe-oF systems:

Namespace: Quantity of non-volatile memory that may be formatted into logical blocks. When formatted, a namespace of size n is a collection of logical blocks with logical block addresses from 0 to (n−1). In this description, the acronym "NS" is used as shorthand for Namespace.

NVM Subsystems: Entities each including one or more controllers, zero or more namespaces, one or more ports, a non-volatile memory storage medium, and an interface between the controller(s) and non-volatile memory storage medium.

Discovery Service: Reports NVM Subsystems and NVM Subsystem Ports to Hosts.

Controllers: Enable Hosts to access Namespaces for submitting IO commands.

Asymmetric Namespace Access (ANA) Group: Contains namespaces for which each access path to the controller is always in the same ANA path state for all namespaces in the ANA Group (Optimized, Non-Optimized, Inaccessible, Persistent Loss).

Generally, a disclosed approach is to create a total of N PEs per appliance per host, where each appliance is composed of N nodes sharing storage among them, for all hosts that access NVMe vVols hosted by a storage cluster. A PE for NVMe vVols is realized as an ANA Group, used for aggregating the namespaces having common access path state (Optimized, Non-Optimized, Inaccessible, Persistent Loss). Since an empty ANA Group without any member namespaces cannot be discovered in-band using NVMe, and the information about a PE is needed for setting setPEContext ( ) in VASA functioning, therefore the solution proposes to create a dummy NS in each ANA Group. The dummy NS contains little or no actual storage, but rather exists solely for discovery and configuration purposes as described herein to enable a host to determine the information about the ANA Group before any NVMe vVols are created in that ANA group, because an ANA Group for vVols is never empty if it always includes at least a dummy NS. After ANA Groups are discovered, vVols can be created as corresponding additional namespaces (non-dummy) that are grouped by the ANA Groups.

Important specifics of the above general technique are described herein. The technique contributes to high availability and minimized access latency, e.g., by providing at least two ANA paths to each PE (at least one optimized, others non-optimized during normal operating conditions). Additionally, the technique can be used in support of load balancing for improved overall performance. It also addresses the need to impose limits on notifications and on the reporting of PEs, as mentioned above.

Embodiments

Figure 1:
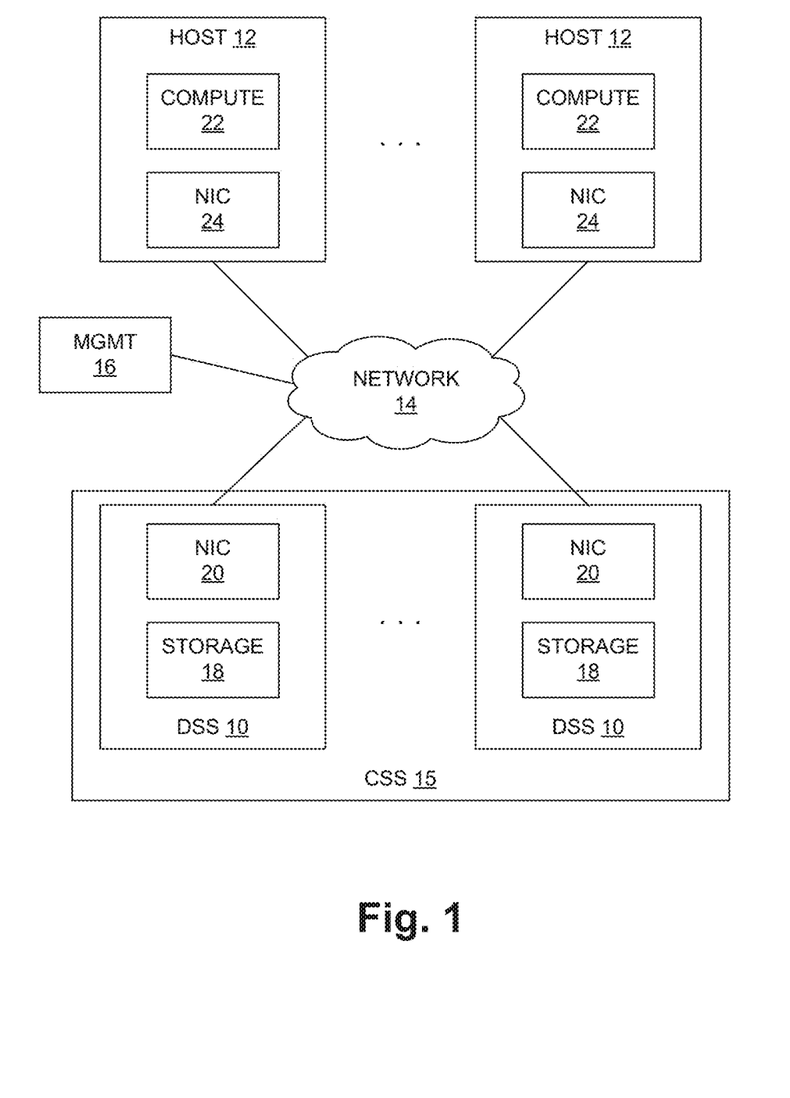
FIG. 1 is a block diagram of a computer system.

FIG. 1 shows a data processing system having a plurality of data storage systems (DSSs) 10 and host computers (HOSTS) 12 functionally coupled by one or more data communications networks 14. The DSSs 10 constitute a clustered storage system (CSS) 15, also referred to as a "cluster" herein. The system may also include a management station 16 as shown. The DSSs 10 include respective storage subsystems 18 and network interface subsystems shown as network interface controllers (NICs) 20, and the hosts 12 include respective compute subsystems 22 and network interface controllers/subsystems (NICs) 24. As generally known in the art, each subsystem 18-24 includes corresponding hardware and software resources specially tailored for the corresponding functionality. The compute subsystem 22 includes processors, memory and interface logic enabling it to execute system-level software such as operating systems, hypervisors, etc. along with user-level applications such as database applications, transaction applications, other server applications, etc. The network subsystems 20 and 24 include specialized interface circuitry, processing circuitry and software/firmware enabling them to provide data communications services including local-area networking, clustering, wide-area networking, storage-area networking, etc. The storage subsystem 18, which may also be referred to as a data storage subsystem 18 herein, includes specialized interface circuitry, processing circuitry, software/firmware, and physical storage devices (such as disks, Flash memory modules, etc.) enabling it to provide a variety of secondary storage related services. More details regarding the storage subsystems 18 in particular are provided below.

The present description alternatively refers to a data storage system 10 as an "appliance".

In the present description it is assumed that the network 14 employs a certain type of host-to-storage attachment technology such as NVMe over Fabrics (NVMe-oF), as mentioned above (i.e., a technology lacking a notion of a conglomerate or subsidiary LUN/device), and thus requiring some alternative arrangement for supporting protocol endpoints (PEs) as used in the VASA protocol. This aspect is described more below.

Figure 2:
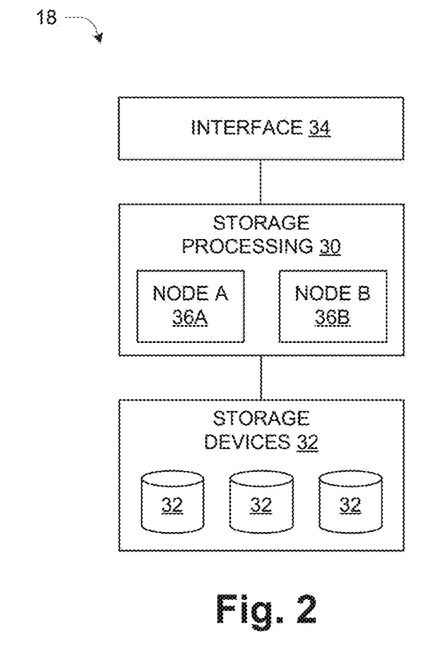
FIG. 2 is a block diagram of a data storage system from a hardware perspective.

FIG. 2 is a block diagram of the storage subsystem 18. It includes a storage processing unit 30, a set of physical storage devices 32, and interface circuitry 34 for interfacing to the associated network subsystem 20 (FIG. 1). The storage processing unit 30 has two separate processing nodes, shown as an A node 36A and a B node 36B. Each of these is a complete storage processor with software and firmware providing all storage-related functionality, for example the handling of incoming storage read and write requests, configuration and maintenance operations, and in particular data and management operations related to virtual volumes (vVols), as briefly mentioned above and described more fully below. In this respect the operating software interacts with corresponding virtual-computing functionality of the hosts 12 and the management station 16, as well as with peer storage systems 18 of other appliances DSSs 10.

In one embodiment a collection of data storage systems 10 is organized as a cluster 15 to provide increased performance and resiliency, as generally known in the art. Cluster functionality is also implemented in the operating software executed by the nodes 36A, 36B. Overall cluster functionality includes "active-active" redundancy in which (1) in the absence of failures, each node 36 processes a corresponding portion of an overall workload, so there is workload sharing among the nodes 36A, 36B of the DSSs 10, and (2) upon failure of one node 36, its workload is automatically transferred to the other node 36 of the same DSS 10, providing for ongoing operation albeit at possibly reduced performance until the failure is corrected or other corrective action is taken.

The description below is directed to operation at a logical layer generally above the physical layer at which data is transferred to and from the physical storage devices 32. As generally known in the art, data storage systems typically create logical abstractions of underlying storage and present these to operating software (e.g., applications, operating systems, hypervisors) to provide certain system benefits. For example, the specialized chores of managing the physical storage devices 32 can be contained in the storage subsystem 18, freeing the hosts 12 and their various operating software (especially applications) from any need to address such details. Block-structured abstractions such as logical units (LUNs) and volumes are generally known. A file system and its collection of user-visible files and directories is also such an abstraction. Such higher-level logical operations may be provided by the storage processing unit 30. The present description is directed to certain specific types of higher-level logical operations, related to virtual volumes (vVols) and protocol endpoints (PEs), as described more below.

Figure 3:
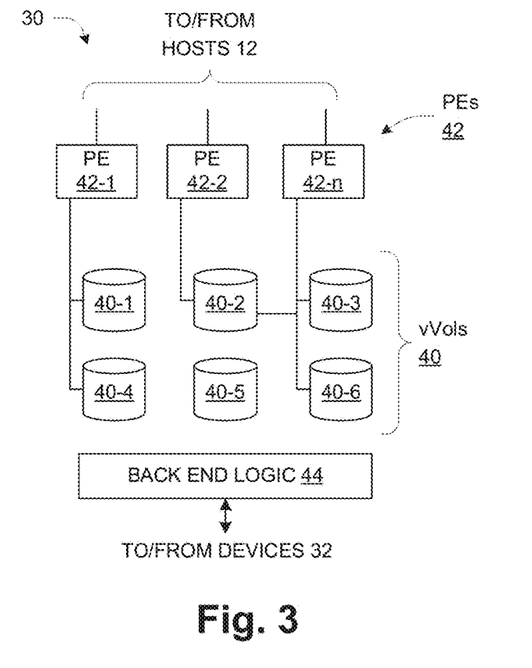
FIG. 3 is a functional block diagram of a storage processing component.

FIG. 3 illustrates pertinent logical-layer organization of the storage processing unit 30. It includes virtual volumes or vVols 40, protocol endpoints or PEs 42, and back end logic 44. The vVols 40 are targets of data storage requests from the hosts 12 as external requestors, and the back end logic 44 provides a translation between operations on the vVols 40 and the underlying physical storage devices 32. Although the operations involved in this translation are generally very involved and complex, they are generally known in the art and not elaborated further herein. In one example the external requestors are hypervisors executing on the compute subsystems 22 of the hosts 12.

A major function of the PEs 42 is to serve as groupings of vVols 40. This is indicated in FIG. 3 by specific interconnections, e.g., the connection between PE 42-1 and vVols 40-1 and 40-4 for example. This means that PE 42-1 is the access point (for external requestors) for these two vVols. As explained more below, the PEs 42 are host-specific and thus each PE 42 groups those vVols 40 that are accessed by the corresponding host 12. Under many operating circumstances a given vVol 40 may be accessible to only a single host, either indefinitely or at least during extended operating periods. However, in some cases a vVol 40 may be accessible to multiple hosts, and in that case it may be grouped by multiple PEs 42 accordingly. FIG. 3 shows an example in which vVol 40-2 is grouped by PE 42-2 (for one corresponding host) and also by PE 42-n (for another corresponding host). An example use case for such shared access is migration of a virtual machine from one physical machine to another, e.g., using a facility such as vMotion®.

More specifically, in one embodiment a PE 42 is realized as an Asymmetric Namespace Access (ANA) group that contains an associated set of namespaces, each corresponding to a respective vVol 40. A PE 42 serves as a single access point for data traffic for its grouped vVols 40. In one embodiment, the storage subsystem 18 supports asymmetric multipathing used by a multipathing function (driver) of the hosts, and the PEs 42 are visible as part of the logical paths extending to storage resources 32. Within the storage subsystem 18, ANA Groups maintain access path state that is common to all their member namespaces (vVols).

Figure 4:
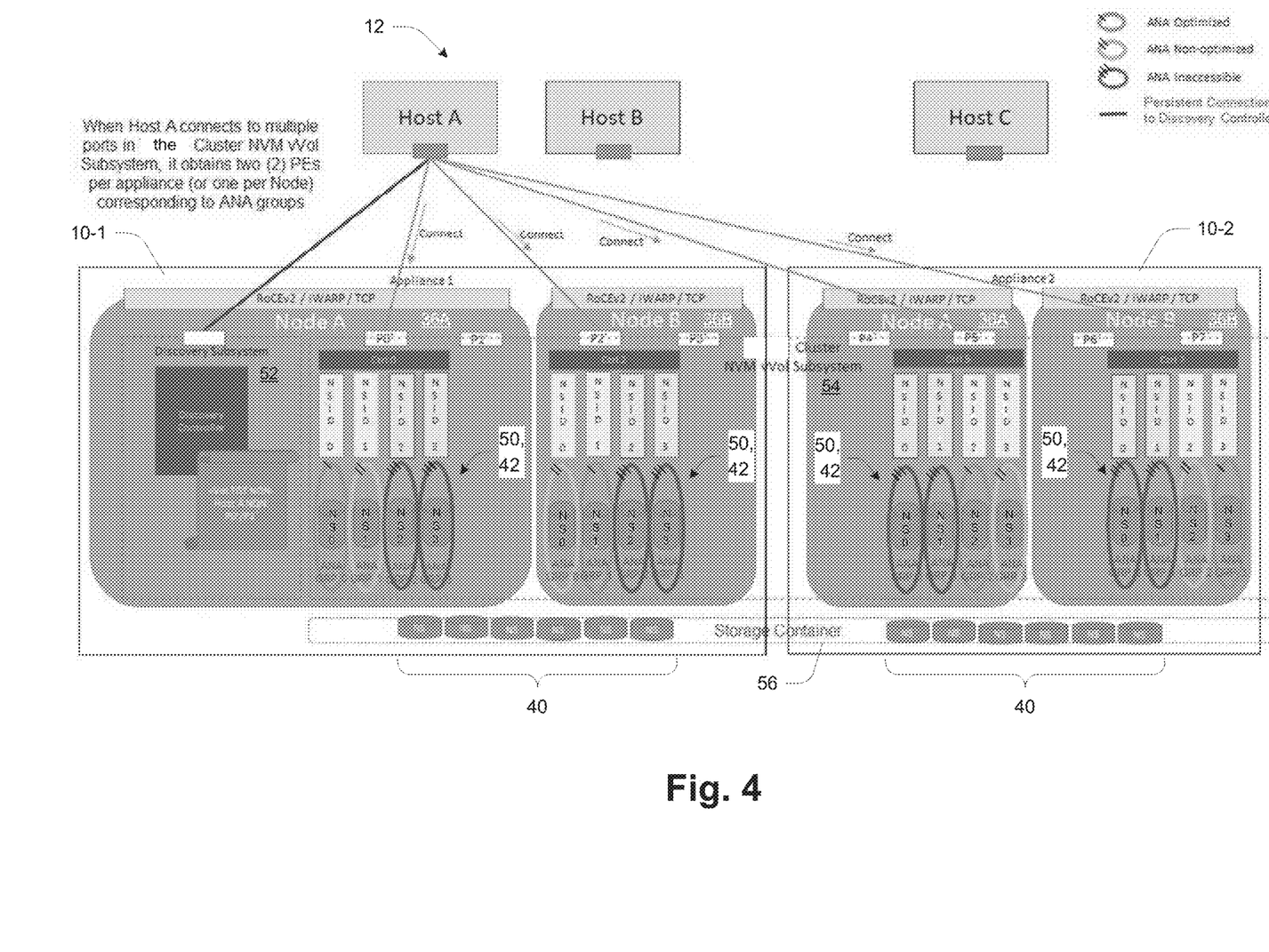
FIG. 4 is a schematic diagram of a cluster of data storage systems, specifically showing features pertaining to the realization of protocol endpoints as Asymmetric Namespace Access (ANA) groups.

FIG. 4 is a schematic depiction of PE-related organization of the DSSs 10. FIG. 4 shows a simplified cluster arrangement having two DSSs 10-1, 10-2 as members (shown and referred to as Appliance 1, Appliance 2). Details of each processing node 36 are shown, including ANA Groups 50 as well as the vVols 40, which are labeled NS for "namespace". Each ANA Group 50 implements a corresponding PE 42 (FIG. 3).

FIG. 4 illustrates the following important features of storage attachment in systems employing NVMe-oF or similar technology:

Namespaces (NS), each being a quantity of non-volatile memory that may be formatted into logical blocks. When formatted, a namespace of size n is a collection of logical blocks with logical block addresses from 0 to (n−1). Each NS implements a corresponding vVol 40, except for so-called "dummy" namespaces as described below.

Cluster NVM Subsystems 54 (one shown), each including one or more controllers (Ctrl0, Ctrl2, Ctrl5, Ctrl7 shown), zero or more namespaces, one or more ports (P0-P7 shown), a non-volatile memory storage medium (shown as container) 56, and an interface between the controller(s) and non-volatile memory storage medium 56.

Discovery Subsystem 52 that provides a discovery service that reports NVM Subsystems 54 and NVM Subsystem Ports Px. In the illustrated example, the discovery subsystem 52 resides on the A node 36A of Appliance 1 of the cluster.

Controllers (Ctrlx) that allow hosts 12 to attach to Namespaces for submitting commands.

Asymmetric Namespace Access (ANA) Groups 50 that contain namespaces (NS) attached by a host 12 via a controller and in the same access state (selected from Optimized, Non-Optimized, Inaccessible, and Persistent Loss; described more below).

As mentioned above, clustered storage systems can be classified as Symmetric or Asymmetric, and it may be desired that a DSS 10 support and participate both types of cluster deployments. A solution to cover both types of deployments is to create a total of N PEs 42 per appliance (DSS) 10 per host 12, where each appliance 10 has N nodes 36 sharing storage among them, for all the hosts 12 that access NVMe vVols 40 hosted by the cluster. In the simplified example of FIG. 4, this translates to twelve (12) PEs 42 (two appliances, two nodes per appliance, and three hosts); FIG. 4 shows only the four PEs 42 for a single host 12 (Host A). A PE 42 for NVMe vVols uses the concept of ANA Group 50 for aggregating the namespaces having common access path state (Optimized, Non-Optimized, Inaccessible, Persistent Loss). To support discovery of PEs 42, each ANA Group is 50 created with a corresponding "dummy" namespace, shown as NS0-NS3 for each node 36 in FIG. 4. The dummy namespaces are needed to address a problematic circularity in NVMe: An empty ANA Group without any member namespaces can't be discovered in-band using NVMe, but information about a PE (ANA Group) is needed for the setPEContext ( ) operation in the VASA API, which is a prerequisite to creating vVols 40 (corresponding to non-dummy namespaces NS). Creating each ANA Group 50 with a respective dummy namespace enables a host 12 to determine the information about ANA Group 50 before any vVols 40 (and associated namespaces NS) are created, because the ANA Group 50 is never empty and always includes at least a dummy namespace.

A dummy namespace is a namespace without any storage and is created in an ANA Group 50 before a host 12 does in-band discovery of ANA Groups 50 (PEs 42). The purpose of a dummy namespace is to behave enough like a regular namespace (aside from storing data) to make the above-described functionality work.

FIG. 4 illustrates a simplified Asymmetric Clustered Storage System with two DSSs or appliances 10 (shown as Appliance 1 and Appliance 2). Each appliance has two nodes 36A, 36B. A pair of PEs 50 are created for each appliance 10, or one PE per node 36. Thus, Appliance 1 creates ANA Group 0 with associated dummy namespace NS0 and ANA Group 1 with associated dummy namespace NS1, and Appliance 2 creates ANA Group 2 with associated dummy namespace NS2 and ANA Group 3 with associated dummy namespace NS3. Even though each node 36 creates only one ANA Group 50 for storage optimized on that node, the ANA groups 50 are shared cluster-wide and thus each node 36 advertises access to the other ANA Groups 50 although it may not be an optimized access. In the illustrated example, Node 36A on Appliance 1 provides optimized access to those namespaces in ANA Group 0, and provides non-optimized access to those namespaces in ANA Group 1 (for which optimized access is via Node 36B on Appliance 1). Note that Node 36A also provides Inaccessible "access", or path state, to namespaces in ANA Groups 2 and 3, for which the corresponding actual storage is captive to another cluster appliance (Appliance 2). This aspect is discussed further below.

The creation of two PEs 42 per two-node appliance 10 makes each PE 42 highly available as there are at least two Asymmetric Namespace Access (ANA) paths to each PE 42, one in Active/Optimized state and other in Active/Non-Optimized. If the primary node 36 for a PE 42 (exposing Active/Optimized) fails, all IO transactions continue using the same PE 42 over an Active/Non-Optimized path on the other node 36. This is illustrated for the example of FIG. 4 as follows:

| | DSS 10-1, Node 36A | DSS 10-1, Node 36B | DSS 10-2, Node 36A | DSS 10-2, Node 36B |
|---|---|---|---|---|
| ANA Group 0 | O | N-O | I | I |
| ANA Group 1 | N-O | O | I | I |
| ANA Group 2 | I | I | O | N-O |
| ANA Group 3 | I | I | N-O | O | where:
O means Optimized
N-O means Non-Optimized
I means Inaccessible

As noted above, there may generally be at least two ANA paths to each PE, at least one being optimized, others non-optimized, during normal operating conditions. There may be failure conditions in which there are temporarily no optimized ANA paths to a namespace, e.g., an appliance with all optimized paths fails, and the storage system is performing a process of responding to that failure.

Because the storage back-end (devices 32) is shared by both nodes 36 in each appliance 10, all IO transactions are still served with little or no latency penalty from redirection (i.e., access via the Non-Optimized path). For Namespaces that are Inaccessible, IO transactions are rejected by such nodes, and the storage system software requires copying or moving the underlying data in order to service I/O to that data at such nodes because the storage is not shared across appliances and I/Os are not forwarded. Other embodiments may forward I/Os at a higher latency cost.

Also, because both PEs 42 can bind all vVols 40 hosted by a given appliance 10, the choice of PE 42 for each specific bind request from the hosts 12 determines a vVol's affinity to a node 36. Thus, load balancing algorithms such as the following may be realized:

1. Static load-balancing (either host-based or storage-based): In host-based load balancing, the hosts 12 are statically divided into two groups (for example based on identifiers being odd or even), and the vVols 40 for one group are always bound through the PEs 42 on the A Node 36A and for the other group through the PEs 42 on the B Node 36B. This is a simple algorithm that is easy to implement. In storage-based load balancing, the vVols are divided into two groups.

2. Dynamic load balancing: To handle dynamically shifting loads, for each incoming vVol bind request the current loading of the nodes 36A, 36b are evaluated and one of the nodes is picked for binding the vVol. Additionally, ongoing monitoring may be used to detect if nodes go out of balance during operation, in which case rebind events can be initiated to the hosts 12 (or done by the DSS 10 and made visible to the hosts 12) to cause vVols to be re-bound and re-distribute loading accordingly.

Another feature of using per-host PEs 42 is to manage asynchronous notifications as mentioned above. In general, an event occurring on a DSS 10 of a cluster could be communicated to all hosts 12 supported by the cluster, on the theory that the notification may be relevant to any of the hosts 12. However, with dedicated PEs 42 for each host 12, each DSS 10 can instead limit the communication of asynchronous events to only those hosts 12 associated with the affected storage, which keeps the exchanged notifications between hosts 12 and the storage system 10 to reasonable level and promotes front-end scalability (ability of a DSS 10 to support more hosts 12).

Another aspect is a requirement for careful handling for out of band management communications (e.g., VASA 2.0 management API) scaling. In a given cluster, the number of PEs is Nhosts x Nappliances, x Nnodes_per_appliance, which for simplified system of FIG. 4 results in 12 PEs (Nhosts=3, Nappliances=2, Nnodes_per_appliance=2). However, for a more realistic cluster of eight 2-node appliances supporting up to 64 external hosts, there could be as many as 2,048 PEs. To make sure that the hosts recognize the PEs correctly, it is necessary to limit the PEs returned for queryProtocolEndpointForArray( ) VASA API command to only those PEs visible to the host that issued the command, rather than all PEs actually defined on the DSS. In the simplified example of FIG. 4, the response to such a query from Host A would return only identifications of ANA Groups 0-3 used for that Host A—it would not return identifications of ANA Groups used for Host B or Host C (none of which are shown in FIG. 4).

Figure 5:
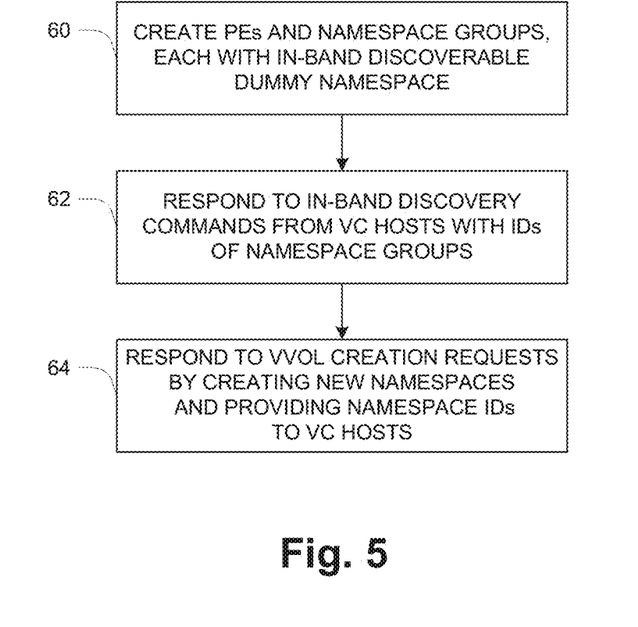
FIG. 5 is flow diagram of high-level operation of a DSS in relevant part.

FIG. 5 is a flow diagram of key operation of a data storage system (e.g., DSS 10) at a high level. At 60, it creates protocol endpoints (PEs) and corresponding namespace groups, wherein each namespace group is a grouping of namespaces corresponding to virtual volumes (vVols) to be bound for access by a respective VC host, and each namespace is mapped to corresponding underlying physical storage of the data storage system. Each namespace group is initially created with a corresponding in-band discoverable dummy namespace.

At 62, in response to in-band storage discovery commands from the VC hosts, and based on the existence of the dummy namespaces, the DSS 10 sends responses identifying the namespace groups to the respective VC hosts.

ANA Groups are assigned ANA Group Identifiers (ANAGRPIDs), and Namespaces are assigned Namespace Identifiers (NSIDs). In both cases, the identifier is unique cluster-wide (i.e., unique within the NVM subsystem).

At 64, in response to subsequent vVol creation commands from the VC hosts, the DSS 10 creates respective new namespaces in respective namespace groups, and provides respective namespace identifiers for the new namespaces to the VC hosts for use in accessing data of the respective vVols.

While various embodiments of the invention have been particularly shown and described, it will be understood by those skilled in the art that various changes in form and details may be made therein without departing from the scope of the invention as defined by the appended claims.

What is claimed is:

1. A method of operating a data storage system in a cluster of storage systems to provide virtual-volume data storage to a plurality of virtual-computing (VC) hosts, comprising:
creating protocol endpoints (PEs) and corresponding namespace groups, each namespace group being a grouping of namespaces corresponding to virtual volumes (vVols) to be bound for access by a respective VC host, each namespace being mapped to corresponding underlying physical storage of the data storage system, each namespace group initially created with a corresponding in-band discoverable dummy namespace;
in response to in-band storage discovery commands from the VC hosts, and based on the existence of the dummy namespaces, sending responses identifying the namespace groups to the respective VC hosts;
in response to subsequent vVol creation commands from the VC hosts, creating respective new namespaces in respective namespace groups, and providing respective namespace identifiers for the new namespaces to the VC hosts for use in accessing data of the respective vVols, wherein the data storage system includes a plurality of processing nodes and creates a corresponding number of PEs per each of the VC hosts, and wherein a first processing node presents a first PE as having an Optimized access path state for the first processing node and presents a second PE as having a Non-optimized access path state for the first processing node, and a second processing node presents the first PE as having the Non-optimized access path state for the second processing node and presents the second PE as having the Optimized access path state for the second processing node.

2. The method of claim 1, wherein the data storage system supports asymmetric access by a multipathing function of the VC hosts, and the PEs realized as Asymmetric Namespace Access (ANA) Groups are used for aggregating namespaces having common access path state as used by the multipathing function for directing storage TO requests to the data storage system.

3. The method of claim 2, wherein the access path states are selected from Optimized, Non-Optimized, Inaccessible and Persistent Loss.

4. The method of claim 1, wherein:
during normal non-failure operation, the first processing node services IO transactions for vVols associated with the first PE and the second processing node services IO transactions for vVols associated with the second PE; and
during operation when one of the first or second processing nodes has failed, a non-failed one of the processing nodes services the IO transactions for vVols associated with both the first PE and the second PE.

5. The method of claim 1, wherein:
during normal non-failure operation, the first processing node services IO transactions for vVols associated with the first PE and the second processing node services IO transactions for vVols associated with the second PE; and
during operation when a respective path to one of the first or second processing nodes has failed, the processing node on the non-failed path services the IO transactions for vVols associated with both the first PE and the second PE.

6. The method of claim 1, wherein one or more shared vVols are accessible to multiple of the VC hosts, and the shared vVols are grouped by multiple per-host PEs accordingly.

7. The method of claim 6, wherein the multiple VC hosts perform a migration operation of migrating data from one of the shared vVols to another vVol.

8. The method of claim 1, wherein the data storage system selectively assigns vVols to the namespace groups to realize load balancing among the processing nodes.

9. The method of claim 1, wherein the PEs per each VC host form a respective first per-host set for PEs accessible via the data storage system, and wherein the data storage system also maintains respective second per-host sets of PEs for each other data storage system of the cluster, the PEs of the second per-host sets being presented as having an Inaccessible access path state for the data storage system.

10. The method of claim 9, wherein the data storage system limits its communication of asynchronous events to those VC hosts associated with affected storage, according to the association of namespaces with respective VC hosts via the per-host sets of PEs.

11. The method of claim 9, wherein the data storage system, in response to a PE query command from a VC host, limits its identification of PEs to those PEs visible to the host that issued the command.

12. A data storage system comprising physical data storage, an interface to a plurality of virtual-computing (VC) hosts, and processing nodes executing computer program instructions to perform a method of providing virtual-volume data storage to the VC hosts, the method including:

creating protocol endpoints (PEs) and corresponding namespace groups, each namespace group being a grouping of namespaces corresponding to virtual volumes (vVols) to be bound for access by a respective VC host, each namespace being mapped to corresponding underlying physical storage of the data storage system, each namespace group initially created with a corresponding in-band discoverable dummy namespace;

in response to in-band storage discovery commands from the VC hosts, and based on the existence of the dummy namespaces, sending responses identifying the namespace groups to the respective VC hosts;

in response to subsequent vVol creation commands from the VC hosts, creating respective new namespaces in respective namespace groups, and providing respective namespace identifiers for the new namespaces to the VC hosts for use in accessing data of the respective vVols, wherein the data storage system creates, for the processing nodes, a corresponding number of PEs per each of the VC hosts, and wherein a first processing node presents a first PE as having an Optimized access path state for the first processing node and presents a second PE as having a Non-optimized access path state for the first processing node, and a second processing node presents the first PE as having the Non-optimized access path state for the second processing node and presents the second PE as having the Optimized access path state for the second processing node.

13. The data storage system of claim 12, wherein the data storage system supports asymmetric access by a multipathing function of the VC hosts, and the PEs realized as Asymmetric Namespace Access (ANA) Groups are used for aggregating namespaces having common access path state as used by the multipathing function for directing storage IO requests to the data storage system.

14. The data storage system of claim 13, wherein the access path states are selected from Optimized, Non-Optimized, Inaccessible and Persistent Loss.

15. The data storage system of claim 12, wherein:

during normal non-failure operation, the first processing node services IO transactions for vVols associated with the first PE and the second processing node services IO transactions for vVols associated with the second PE; and during operation when one of the first or second processing nodes has failed, a non-failed one of the processing nodes services the IO transactions for vVols associated with both the first PE and the second PE.

16. The data storage system of claim 12, wherein:

during normal non-failure operation, the first processing node services IO transactions for vVols associated with the first PE and the second processing node services IO transactions for vVols associated with the second PE; and during operation when a respective path to one of the first or second processing nodes has failed, the processing node on the non-failed path services the IO transactions for vVols associated with both the first PE and the second PE.

17. The data storage system of claim 12, wherein the data storage system selectively assigns vVols to the namespace groups to realize load balancing among the processing nodes.

18. The data storage system of claim 12, wherein the PEs per each VC host form a respective first per-host set for PEs accessible via the data storage system, and wherein the data storage system also maintains respective second per-host sets of PEs for each other data storage system of the cluster, the PEs of the second per-host sets being presented as having an Inaccessible access path state for the data storage system.

19. The data storage system of claim 18, wherein the data storage system limits its communication of asynchronous events to those VC hosts associated with affected storage, according to the association of namespaces with respective VC hosts via the per-host sets of PEs.

20. The data storage system of claim 18, wherein the data storage system, in response to a PE query command from a VC host, limits its identification of PEs to those PEs visible to the host that issued the command.

\* \* \* \* \*